Oct. 19, 1965   R. A. OWENS   3,212,361
VARIABLE SPEED TORQUE DRIVE MECHANISM
Filed June 28, 1963
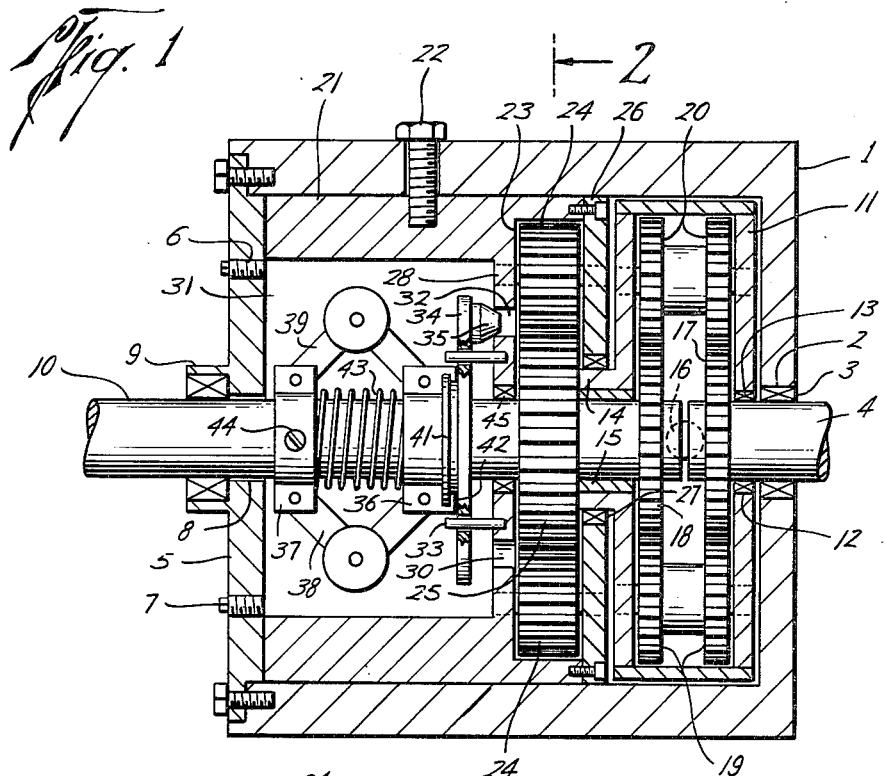
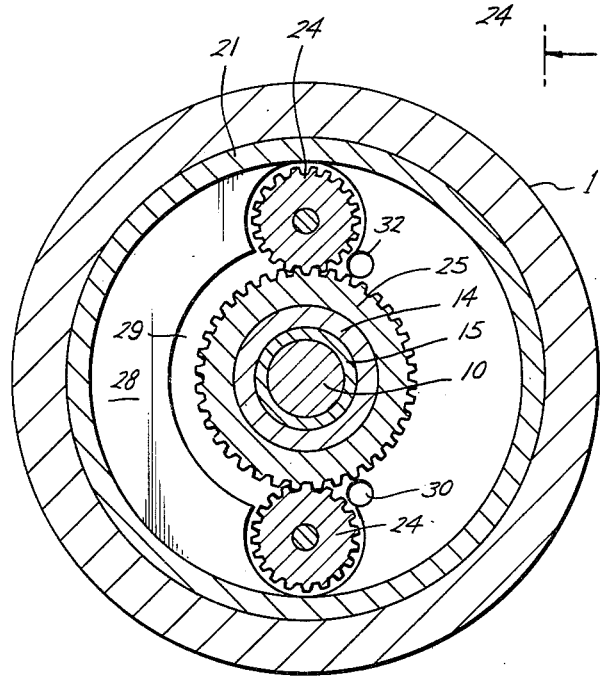
Ray A. Owens
INVENTOR.
BY Pamela O. Wyatt
ATTORNEY United States Patent Office 3,212,361
Patented Oct. 19, 1965

3,212,361
VARIABLE SPEED TORQUE DRIVE
MECHANISM
Ray A. Owens, 1002 Bissonnet, Houston, Tex.
Filed June 28, 1963, Ser. No. 291,346
5 Claims. (Cl. 74—791)

This invention relates to new and useful improvements in a variable speed torque drive mechanism.

It is an object of this invention to provide a drive mechanism for use on rotary or piston driven compressors, and the like, having means for maintaining a constant speed on the driven shaft while being rotated by a variable speed motor.

It is another object of the invention to provide a torque drive mechanism having novel means for selectively determining the speed desired for the driven shaft and maintaining said speed constant as the speed of the driving shaft fluctuates.

It is another object of the invention to provide a variable speed torque drive mechanism employing oil as a means for maintaining the speed of the driven shaft constant as the speed of the driving shaft varies.

With the above and other objects in view, the invention has relation to certain novel features of construction, operation and arrangement of parts more particularly defined in the following specifications and illustrated in the accompanying drawings, wherein:

FIGURE 1 is a side elevational view of the drive mechanism, in cross section, and FIGURE 2 is a cross sectional end view taken on the line 2—2 of FIGURE 1.

Referring now more particularly to the drawings, the numeral 1 designates a housing having a driven shaft port 2 and bearings 3, through which the driven shaft 4 extends. On the end of the housing 1 opposing the port 2 is the demountable face plate 5 having an oil fill port 6 and drain port 7, and axially aligned with the port 2 is the port 8 and the bearing 9 through which the driving shaft 10 extends.

The gear housing 11 is positioned in one end of the housing 1 where it may rotate freely, having the port 12 adjacent and axially aligned with the port 2, in which the bearing 13 is mounted and through which the shaft 4 extends, and having the laterally extending flame 14 forming a bushing retainer for the bushing 15 through which the shaft 10 extends. Suitable anti-friction means, such as the ball 16, is mounted between the abutting ends of the shafts 10, 2.

Sun gears, 17, 18, are mounted on the ends of the shafts 2, 10 in the housing 11 and planetary gears 19, 19 and 20, 20 are rotatably mounted in the housing 11 and are in mesh with the sun gears 17, 18.

An oil case 21 anchored in the housing 1 as by means of the bolt 22, one end of the oil case having a recess 23 in which the idle gears 24, 24 are rotatably mounted. The main pump gear 25 is freely rotatably mounted on the shaft 10 and is in mesh with the gears 24, 24. A plate 26, having an axial bore therein in which the bushing 27 is mounted, closes the recess 23. The extended end of the lateral flange 14 is anchored to the gear 25 so that the gear 25 rotates with the housing 11.

In the wall 28 of the casing 21 a semi-annular groove 29 is formed, which extends from one gear 24 to the other gear 24 and the intake port 30 extends through the wall 28 into the oil chamber 31 and the discharge port 32 similarly extends through the wall 28 into the oil chamber 31.

Guides 33, 33, mounted in the wall 28 and extending laterally therefrom, receive the disc 34 on which is mounted the control plug 35 movable into and out of discharge port 32. The drive shaft 10 extends through the bearing 45 in the side wall 28.

Mounted on the shaft 10 is a governor having the collars 36, 37 and pivotal shafts 38, 39 with weights mounted on the extended ends of said shafts 38, 39. The disc 34 has the annular flanged hub 41 extending laterally therefrom and the collar 36 has the inwardly directed annular flange 42 adapted to engage the hub 41. The collar 36 is yieldably spaced from the collar 37 as by means of the coil spring 43 and the collar 37 is adjustably anchored to the shaft 10 by means of the screw 44.

In operation, collar 34 is adjusted on the shaft 10 to place the desired pressure on the plug 35 and the oil chamber then filled with oil. As the shaft 10 is rotated, as by the engine of an automobile or the like, the gear 18 and housing 11 will be rotated, the housing 11 in turn rotating the gear 25, and the gear 25 pumping oil through the groove 29 to the discharge port 32. As the pressure is built up in the groove 29, the rotation of the gear 25 will be retarded and the planetary gears 19, 20 will rotate, and impart rotation to the gear 17 and shaft 4 for operation of the compressor or other workload affixed to the shaft 4. As the speed of rotation of the shaft 10 increases, the governor will cause the plug 35 to move away from the discharge port 32, permitting oil to pass therethrough into the chamber 31 and relieving pressure on the gear 25 and permitting slippage through the planetary gears, so that the desired speed on the shaft 4 will remain constant, the variations in speed of rotation of the shaft 10 similarly varying the pressure on the gear 25. The limit of opening of the plug may be determined by the strength of the spring 43 and the adjustment of the collar 34.

While the foregoing is considered a preferred form of the invention, it is by way of illustration only, the broad principle of the invention being defined by the appended claims.

What I claim is:

1. In a variable speed torque drive mechanism, an outer housing, a rotatable gear housing within the outer housing, sun and planetary gears in the gear housing, a driving shaft rotating said sun gear and a driven shaft rotated by said planetary gears, a pump gear rotatable by said gear housing, means for applying hydraulic pressure to said pump gear and means for varying the pressure on said pump gear to stabilize the rotation of said driven gear as the speed of the driving gear varies.

2. In a variable speed torque drive mechanism, an outer housing, a rotatable gear housing within the outer housing, sun and planetary gears in the gear housing, a driving shaft rotating said sun gear and a driven shaft rotated by said planetary gears, a pump gear rotatable by said gear housing, means for applying hydraulic pressure to said pump gear to restrict its speed of rotation and means for varying the pressure on said pump gear to stabilize the rotation of said driven gear as the speed of the driving gear varies, and means for adjusting said pressure varying means.

3. In a variable speed torque drive mechanism, an outer housing, a driving shaft extending into said housing at one end and a driven shaft extending into said housing at the other end, a planetary gear housing in said outer housing, the ends of the driving shaft and driven shaft extending into said housing last mentioned, sun gears mounted on said respective shaft ends in said gear housing, planetary gears in said gear housing in mesh with said sun gears, an oil pump operated by said gear housing, and adjustable means on said driving shaft for selectively controlling the flow of oil through said pump varying the speed of said gear housing as the speed of the driving shaft varies.

4. In a variable speed torque drive mechanism, an outer housing, a driving shaft extending into said housing at one end and a driven shaft extending into said housing at the other end, a planetary gear housing in said outer housing, the ends of the driving shaft and driven shaft extending into said gear housing, sun gears mounted on said respective shaft ends and said gear housing, planetary gears in said gear housing in mesh with said sun gears, an oil pump operated by said gear housing, means on said driving shaft for selectively controlling the flow of oil through said pump and varying the speed of said gear housing as the speed of the driving shaft varies, an oil case in said outer housing, said means including a governor on said driving shaft and in said oil case having one end anchored to said shaft and the other end slidably mounted thereon, a coil spring maintaining said ends yieldably apart, a disc connected to said movable end slidably mounted in said oil case, an inlet and a discharge port through said oil case leading to said pump and a closing means carried by said disc and movable into and out of said discharge port.

5. In a drive mechanism, an outer housing, a rotatable gear housing within said outer housing, an oil case in said outer housing, a driving shaft extending into said outer housing and through said oil case and into said gear housing, a driven shaft extending through said outer housing and into said gear housing, sun gears on said shafts in said gear housing, planetary gears in said gear housing and in mesh with said sun gears, a pump gear in said outer housing rotated by said gear housing, said oil case having an oil inlet and an oil discharge port leading to said pump gear and a passageway from said inlet port to said discharge port formed in the oil case adjacent the periphery of the pump gear and a yieldable closure in said discharge port movable into and out of closing position as the speed of the driving shaft varies.

References Cited by the Examiner

UNITED STATES PATENTS 2,890,604  6/59  Campbell.
2,995,049  8/61  Bolliger _____ 74—790 X

FOREIGN PATENTS 1,192,965  4/59  France.

DON A. WAITE, *Primary Examiner.*